July 6, 1965 N. G. BANNERMAN 3,192,622
METHOD OF ATTACHING FITTINGS TO RODS
OR TUBES OF RESIN-BONDED FIBRE
Original Filed July 27, 1959 4 Sheets-Sheet 2
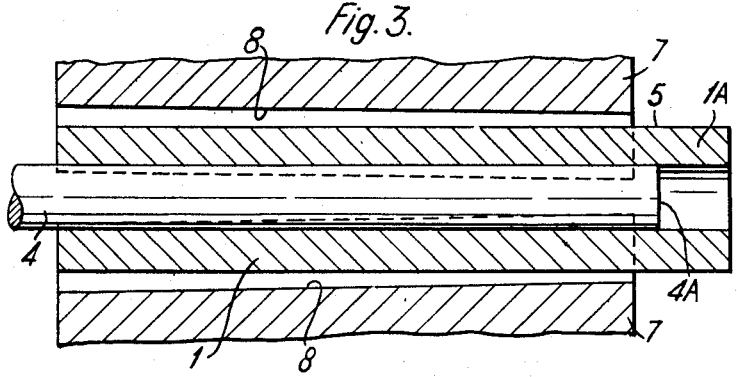
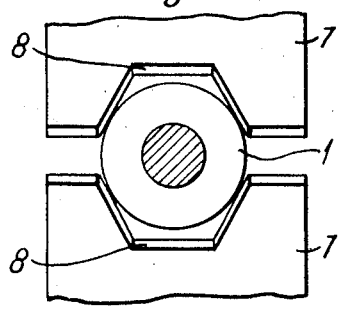
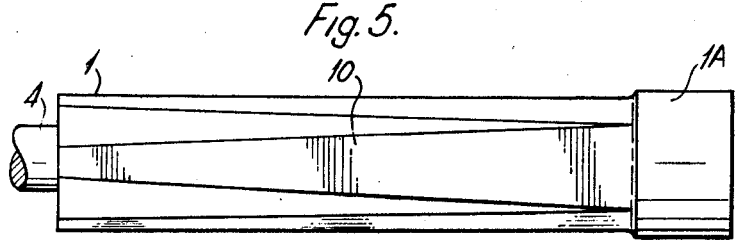
Inventor
N. G. Bannerman
By
Webt Mackey & Burdin
Attorney

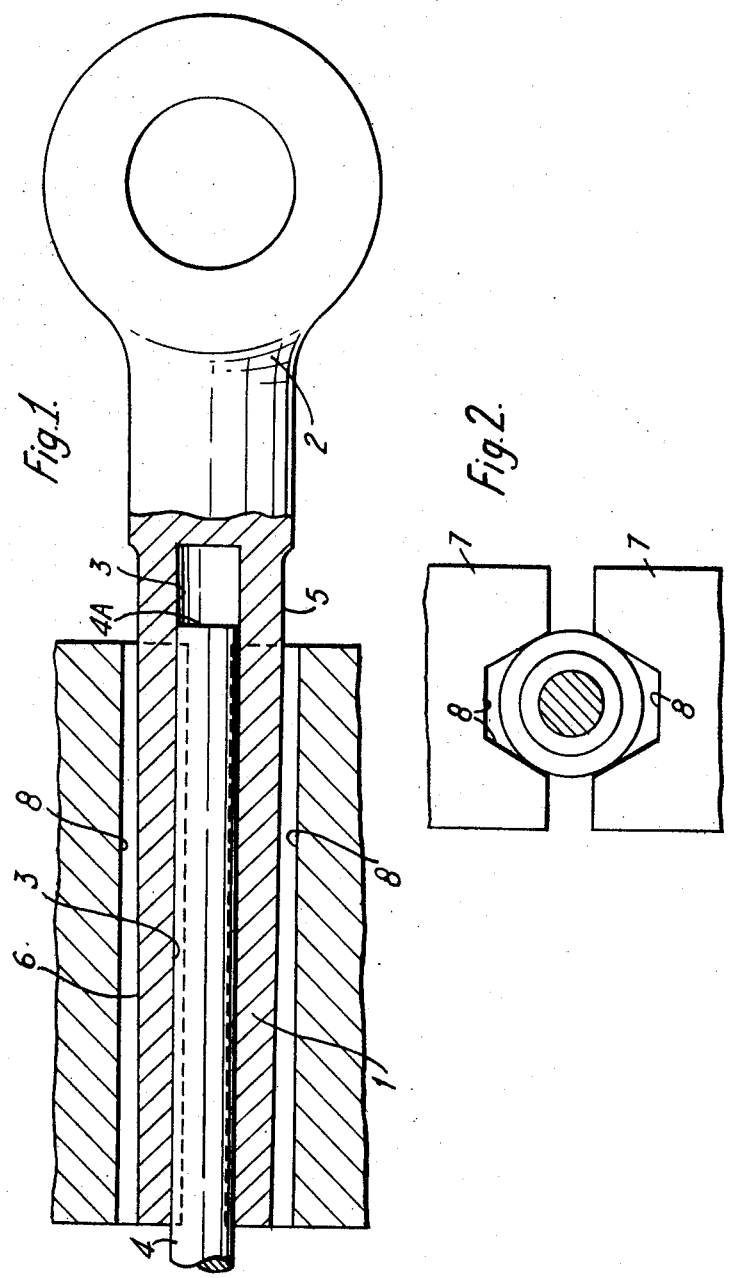

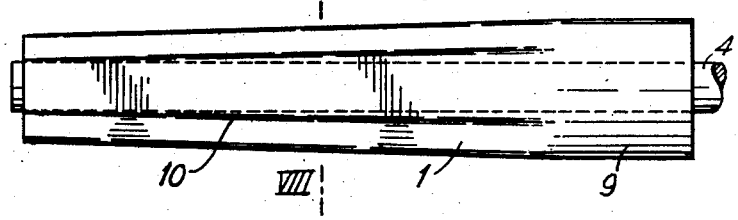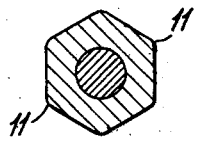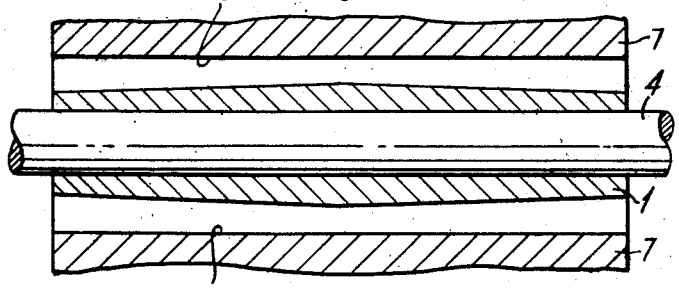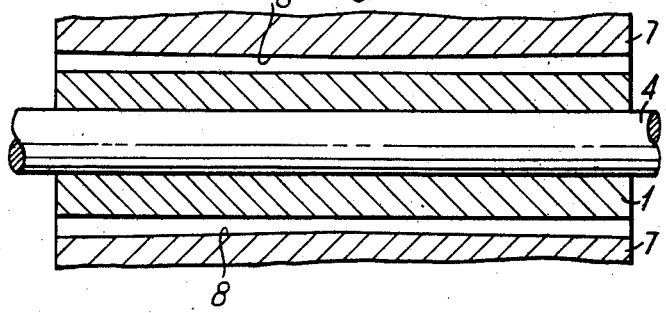

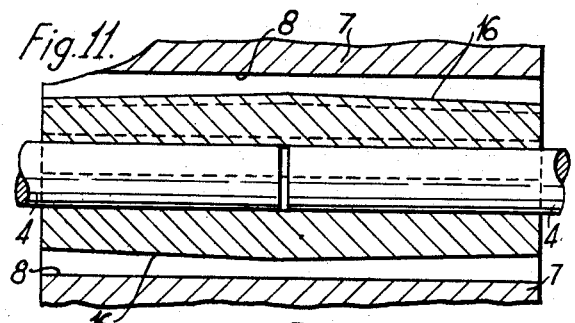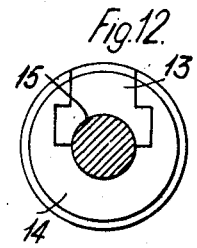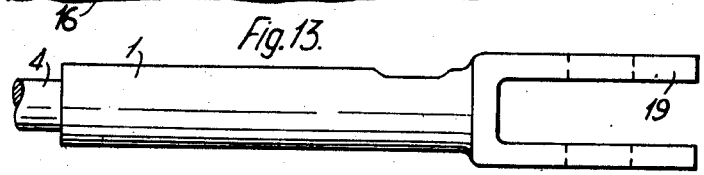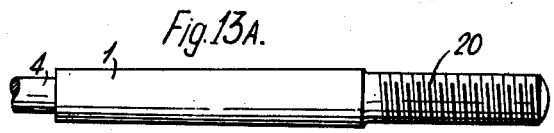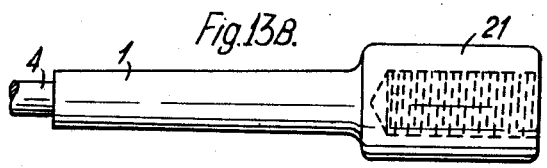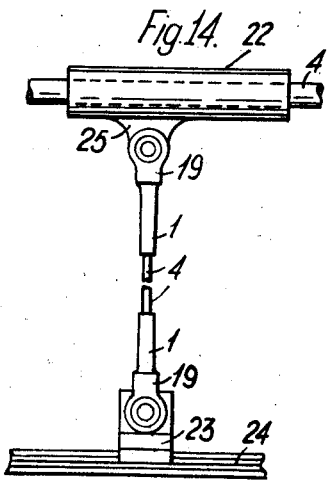

United States Patent Office 3,192,622
Patented July 6, 1965

3,192,622
METHOD OF ATTACHING FITTINGS TO RODS OR TUBES OF RESIN-BONDED FIBRE
Norman George Bannerman, Widnes, England, assignor to British Insulated Callender's Cables Limited, London, England, a British company
Continuation of application Ser. No. 829,717, July 27, 1959. This application June 27, 1963, Ser. No. 291,607
Claims priority, application Great Britain, Aug. 12, 1958, 25,885/58
19 Claims. (Cl. 29—517)

This invention relates to rods and tubes of resin-bonded fibre, more particularly to resin-bonded glass fibre rods and tubes, and is a continuation of my co-pending application Serial No. 829,717, filed July 27, 1959, now abandoned.

The term "glass" when used herein includes silica and other inorganic substances from which it is possible to obtain fibres of high tensile strength and the term "resin-bonded glass fibre" means a body of a thermosetting or cold setting synthetic resin of a kind which sets to a hard and infusible and insoluble condition with or without the application of heat, reinforced with glass filaments distributed throughout the cross-section of the body. In the case of a rod of resin-bonded glass fibre, the glass filaments preferably lie substantially parallel to one another throughout the length of the rod. Preferably also substantially all of the reinforcing glass filaments are of the same or approximately of the same length as the rod. In the case of a tube of resin-bonded glass fibre the filaments may extend helically in layers which may be of the same or opposite hands being in the form of rovings, tapes and/or cloth. Alternatively, the tube may comprise a wall of resin-bonded longitudinally extending filaments which is circumferentially reinforced either internally or externally or both with a layer or layers of resin-bonded helically applied rovings, tape or broadcloth. In such rods and tubes proportions by weight may be:

| | Percent |
|---|---|
| Resin | 25–40 |
| Glass | 75–60 |

According to the persent invention a method of attaching a metal fitting to a rod or tube of resin-bonded glass fibre comprises compressing a malleable metal sleeve, constituting or forming part of the metal fitting, on to the rod or tube in such a way that the compressive force exerted by it on the rod or tube gradually diminishes from a maximum to a minimum over substantially the entire length of the compression joint at the end of the fitting from which the rod or tube is approached or, in the case where a compression joint is made between a rod or tube and a fitting, so located thereon that the rod or tube protrudes from both ends of the fitting and both protruding parts are tensile loaded, the compressive force exerted by the sleeve upon the rod or tube gradually diminishes from a maximum at the middle of the sleeve to a minimum at the ends of the sleeve.

The method may be carried out in various ways and some of these will now be described with reference to the accompanying drawings, wherein:

FIGURE 1 is a longitudinal section with certain parts shown broken away,

FIGURE 2 is an end view of FIGURE 1, looking from left to right in that figure,

FIGURE 3 is a longitudinal section with certain parts shown broken away, and

FIGURE 4 is an end view of FIGURE 3, looking from left to right in that figure.

FIGURE 5 is a longitudinal view in plan, and

FIGURE 6 is also a longitudinal view in plan.

FIGURE 7 is an end view of FIGURE 6 looking from left to right in that FIGURE and FIGURE 8 is a sectional end view of FIGURE 6, the section being taken on the line VIII—VIII of FIGURE 6.

FIGURES 9 and 10 are longitudinal views in section,

FIGURE 11 is a longitudinal view, partly in section, and

FIGURE 12 is an end view,

FIGURES 13, 13A and 13B are longitudinal views in elevation, and

FIGURE 14 is a view in elevation with certain parts shown broken away.

Reference will be made first of all to FIGURES 1 and 2 which illustrate one way of compressing a metal fitting on to an elongated member of resin-bonded glass fibre in such a manner that the compressive force exerted by the metal fitting upon the elongated member gradually diminishes from a maximum value to a minmum value over substantially the entire length of the compression joint as the end of the fitting from which the elongated member projects, is approached.

In FIGURES 1 and 2 the metal fitting is shown as comprising a sleeve 1 and, at one end of the sleeve, an eye 2, the latter providing for the attachment of the fitting to some other member such as, for example, a pole. The fitting, however, need no necessarily have an eye or other attachment means. The sleeve 1 is made of malleable metal, for example, steel, and has a bore 3 of circular cross-section and of uniform diameter throughout the length of the bore. The sleeve 1 is shown placed over an end of a rod 4 made of resin-bonded glass fibre, the line 4A indicating that end of the rod which is located within the sleeve. The rod projects beyond that end of the sleeve remote from the eye 2. The rod 4 is of circular cross-section and of uniform diameter which is slightly less than that of the bore 3 of the sleeve 1 so that the sleeve makes a sliding fit on the rod. The sleeve 1 comprises a part 1A which is disposed adjacent the eye 2 and is of short length as compared with the total length of the sleeve. This part 1A has an outer cylindrical surface 5 and the wall thickness of the sleeve over that part is uniform. The wall thickness of the sleeve 1 then gradually diminishes to the place at which the rod 4 projects beyond the sleeve. Since the bore 3 of the sleeve is of circular cross-section and of uniform diameter through the length of the sleeve, the gradual reduction in wall thickness of the sleeve results in a gradually tapering outer surface 6. The sleeve 1 thus comprises a cylindrical part 1A adjacent the eye 2 and a part which has the form of a frustum of a cone and which extends over a major part of the total length of the sleeve. The sleeve however need not necessarily comprise a part of constant wall thickness.

The sleeve is compressed on to the end of the rod 4 with the aid of a pair of compression dies 7 which form parts of a compression tool. The complete compression tool has not been shown. In FIGURES 1 and 2 the sleeve 1 is shown in a position between the two dies 7 ready to be compressed by the latter on to the rod 4. The length of each die measured parallel to the axis of the rod 4 is such that when the sleeve 1 and the rod 4 therein are correctly assembled between the dies 7, the latter surround the whole of the tapered part of the sleeve 1 and the part 1A of the sleeve of uniform wall thickness lies outside the dies. Each die has three faces 8 and each face lies in a plane which is parallel with the longitudinal axis of the opening formed by the two dies, the longitudinal axis being the axis running longitudinally of the rod 4 when it and its fitting are correctly inserted into the compression tool. As will be seen from FIGURE 1 when the sleeve 1 and its rod 4 are inserted between the two dies, since that part of the sleeve having the cylindrical outer surface 5 lies outside the compression dies, that part of the sleeve is not subjected to the compression exerted by the dies 7. As will be understood from an inspection of FIGURE 2 the three pressure faces 8 of one die 7 co-operate with the corresponding pressure faces of the other die to change the circular shape in cross-section of the tapering part of the sleeve 1 into a hexagonal shape in cross-section upon the application of pressure to the two dies causing them to be forced towards one another. The two dies may be forced towards one another by the application of pressure fluid to the dies or by other means. The movement of approach and separation of the two dies 7 is at right angles to the longitudinal axis of the rod 4 so that the parallel arrangement of the dies and the tapering arrangement of the sleeve 1 co-operate, as will be seen from FIGURE 1, to produce a compressive force upon the sleeve which is a maximum at that end of the tapering part of the sleeve adjacent the eye 2 (the larger end of the sleeve) and gradually diminishes towards the end of the sleeve from which the rod 4 projects where the compressive force is a minimum. The compressive stresses exerted by the sleeve 1 upon the rod are thus a maximum at the inner end of the rod 4 and diminish gradually from that end to the place where the rod projects from the sleeve. By providing the conical part of the sleeve 1 with an appropriate angle of taper and the dies 7 with an appropriate length of stroke, it can be readily arranged that at the end of the sleeve at which the rod 4 projects, the pressure exerted by the dies upon that end of the sleeve is zero or approaches zero. There can thus be avoided a sudden drop, or at least a steep decline, in the value of the compressive stresses applied to the rod at the mouth of the sleeve 1, that is to say, at that end of the sleeve 1 at which the rod 4 projects.

In FIGURES 3 and 4 the eye 2 shown in FIGURES 1 and 2 has been omitted. FIGURES 3 and 4 illustrate an alternative method for gradually reducing the pressure exerted by the sleeve upon the rod. The compression dies 7 are shown in their positions in which they are ready for compressing the sleeve 1 on to the resin-bonded fibre rod 4. In FIGURES 1 and 2 the outer surface of the sleeve 1 tapers in a direction away from the cylindrical part of the sleeve and the pressure faces 8 lie in planes parallel with the longitudinal axis of the rod 4. In FIGURES 3 and 4 the sleeve 1 has a cylindrical bore 3 of uniform diameter throughout its length and the outer surface of the sleeve is cylindrical and of uniform overall diameter throughout its length and the pressure faces 8 are tapered throughout their length, the direction of taper being such that at the place where the sleeve projects beyond the dies 7 the radial distance between the die face and the neighbouring part of the surface of the sleeve is a minimum and the corresponding radial distance at the end of the sleeve at which the rod 4 enters is a maximum. The tapering arrangement of the pressure faces 8 will be clearly seen from FIGURES 3 and 4.

Although not essential to the invention, it is preferred to use sleeves which initially are of circular cross-section and to compress them to a hexagonal shape in cross-section. Sleeves of circular cross-section are shown in FIGURES 1 and 2 and in FIGURES 3 and 4. In FIGURES 1 and 2 the sleeve 1 has a tapering outer surface 6 and the die faces 8 are parallel. In FIGURES 3 and 4 the sleeve has a constant wall thickness throughout its length and the die faces are tapering. In FIGURES 1 and 2 and in FIGURES 3 and 4, the dies 7 co-operate to form a hexagonal shape in cross-section. Whether the arrangement shown in FIGURES 1 and 2 or that shown in FIGURES 3 and 4 be used, the final form of the sleeve 1 will be that shown approximately in FIGURE 5.

In FIGURE 5 there is shown a sleeve 1 compressed onto a rod 4. After compression the sleeve 1 comprises the part 1A of relatively short length which has not been compressed and retains its original circular shape in cross-section. From the inner end of the uncompressed part 1A of the sleeve 1 to the other end of the sleeve, the latter is of hexagonal shape in cross-section. This hexagonally shaped part is indicated by the reference numeral 10 and from FIGURE 5 it will be seen that it extends to that end of the sleeve 1 from which the rod 4 projects, the length of the sides of the hexagon becoming shorter and shorter as the end of the sleeve at which the rod projects is approached. Where found necessary or it is considered desirable, the compressed part of the sleeve 1 may terminate a short distance from that end at which the rod 4 projects, in which case that part of the sleeve will retain its original shape in cross-section.

In FIGURES 6–8 there is shown a sleeve 1 compressed on a rod 4 which, in the view shown, projects from the right hand end of the sleeve, this being the larger end of the sleeve. The rod is also shown projecting from the opposite end of the sleeve for a very short distance. The sleeve is shown compressed to a substantially hexagonal shape in cross-section with rounded corners as shown at 11 in FIGURE 8. The hexagonal shape is shown extending over a major portion of the length of the sleeve 1, the flats 10A formed by the compression gradually increasing in width in a direction towards the larger end of the sleeve. These flats are shown terminating at a short distance from the adjacent end of the sleeve 1 and that part of the sleeve indicated in FIGURE 6 by the reference numeral 9 extending from inner ends of the flats to the adjacent larger end of the sleeve is of cylindrical shape having a uniform thickness of wall and forms an uncompressed part of the original sleeve. In producing the sleeve 1 compressed on the rod 4 as shown in FIGURES 6–8, the sleeve has initially a cylindrical bore of uniform diameter and a wall of uniform thickness extending throughout the length of the sleeve. The sleeve is placed between compression dies each die having three faces each of which is tapered, the relative lengths of the dies and of the sleeve being such that the uncompressed part of the sleeve lies outside the dies. The dies and the sleeve are so relatively disposed that the radial distance between each die and the neighbouring part of the sleeve 1 gradually increases from that end of the sleeve shown to the left in the view of FIGURE 6 towards the opposite end of the sleeve 4.

In FIGURES 1, 3 and 5, the rod 4 is shown projecting only from one end of the sleeve 1, it being assumed that when the sleeve and rod are in use, that part of the rod will be subjected to a tensile load. In FIGURE 4, although the rod 4 is shown projecting from both ends, that end of the rod shown extending a short distance beyond the end of the sleeve 1 shown to the left in the view of FIGURE 6, as will be realised, is not intended to be subjected to a tensile load when the sleeve and rod are in service, the tension loaded part of the rod 4 being that part projecting from the end of the sleeve shown to the right in the view of FIGURE 6.

FIGURES 9 and 10 illustrate the application of the invention to the case where it is required to compress a sleeve 1 of malleable metal on to a rod 4 of resin-bonded fibre, the rod extending right through the sleeve and projecting from both ends of the sleeve and both ends being tensile loaded when the fitting is in service. In FIGURE 9 the co-operating surfaces of the dies 7 and of the sleeve 1 correspond to the arrangement shown in FIGURE 1 but in FIG. 9 the tapering of the outer surface of the sleeve is duplicated, the tapering extending from the middle of the sleeve 1 to each end thereof. The dies have three-sided parallel faces and co-operate with the tapering surfaces of the sleeve to produce a compressed sleeve having a hexagonal shape in cross-section, the flats of the hexagon extending from the middle of the sleeve to or near to each end thereof.

In FIGURE 10 the arrangement corresponds to that shown in FIGURE 3, the sleeve 1 being a cylinder having a uniform wall thickness and an outer surface which is parallel to the longitudinal axis of the rod 4 and the pressure faces 8 of the dies 7 being tapered. In FIGURES 9 and 10, the compressive force exerted by the sleeve 1 upon the rod 4 is a maximum at the middle of the length of the rod and gradually diminishes as the ends of the rod are approached, the compressive force at each end of the sleeve 1 where the rod 4 projects being a minimum. Instead of using one pair of dies as shown in FIGURES 9 and 10, two pairs may be used.

The sleeve 1 may be a single-piece member but where service conditions are such as to make the use of a two-part sleeve necessary or desirable, a sleeve of the kind shown in FIGURES 11 and 12 may be used, it being shown in FIGURE 11 applied to the making of a joint between two rods 4 of resin-bonded glass fibre, an end of each rod projecting beyond that end of the sleeve 1, it being the intention that each rod should be tensile loaded. The sleeve 1 consists of an inner part 13 fitting into an outer part 14 by a relative sliding longitudinal movement of the two parts to form a body having a bore 15 of circular cross-section throughout the length of the body and of constant diameter and an outer surface 16 which tapers gradually from the middle of the sleeve to each end thereof so that the wall of the body is of maximum thickness at the middle of the sleeve and a minimum at each end thereof. This two-part sleeve is shown in FIGURE 11 used in conjunction with a pair of dies 7 each die being three-sided with parallel faces as shown in FIGURE 2. In FIGURE 11 the dies are shown in the position occupied before compression of the sleeve 1 on to the rods 4. From FIGURE 11 and from the previous description, it will be understood that after compressing the dies 7 on to the sleeve 1, the compressive stress exerted by the sleeve upon the two rods will in each case be a maximum at the inner end of the rod and diminish towards each end of the sleeve where the compressive stress will be a minimum, the shape of the sleeve after compression being hexagonal in cross-section, the sides of the hexagon being of maximum width at the middle of the sleeve and diminishing gradually in width from the middle to each end of the sleeve 1.

In FIGURES 1 and 2, the external surface 6 of the sleeve 1 is shown tapered over the whole of that part of its length inserted between the dies 7 of the compression tool. The angle of taper of the external surface (measured as the angle of inclination to the axis of the sleeve) is small and may vary, for example, from 0.25° to 1.75°, an angle of 1.0° being preferred. When tapered compression dies are used a corresponding angle of taper is satisfactory when the tool is intended to be used on sleeves having a cylindrical bore and a wall of uniform thickness.

The metal fitting may consist of a sleeve of malleable metal only or it may comprise a sleeve and some means for attaching the sleeve and the rod or tube of resin-bonded glass fibre on to which the sleeve is compressed, to some other member. This attaching means may be located at an end of the sleeve or it may be located at some place between the two ends. In FIGURE 1 the sleeve 1 is shown provided with an eye 2 located at the larger end of the sleeve, the provision of the eye at the end of the sleeve opposite to that at which the rod projects, permitting the metal fitting to be used as a terminal member in an overhead conductor system of an electric railway or trolleybus system. Other means of attachment located at the appropriate end of the sleeve may, however, be used as will be evident from FIGURES 13, 13A and 13B. In FIGURE 13, the sleeve 1 is shown provided with a clevis 19, in FIGURE 13A with an externally screw-threaded part 20 and in FIGURE 13B, with an internally screw-threaded socket 21. In each case the rod 4 is shown projecting from the opposite end of the sleeve 1. In each case it is assumed that the sleeve 1 initially has the tapering form shown in FIGURES 1 and 2 and it has been compressed upon the rod 4 by the dies shown in those figures. As FIGURES 13, 13A and 13B are merely intended to illustrate various forms of termination that may be used with the sleeve, it has been considered unnecessary to show the details of the final forms of the sleeves after compression, these having been already shown in FIGURE 5.

FIGURE 14 illustrates the application of the invention to the supporting of an overhead conductor from a catenary. The arrangement comprises two metal fittings each comprising a sleeve 1, each sleeve having a clevis 19, the two fittings being compressed on to the opposite ends of a relatively long vertically disposed resin-bonded glass fibre rod 4 which is shown broken away. The upper one of the two fittings is connected to a sleeve 22 compressed on to a horizontally disposed rod 4. The lower of the two fittings is connected to a clip 23 supporting an overhead conductor 24. The horizontally disposed rod 4 serves as a catenary for the support of the overhead conductor and extends through and on opposite sides of the sleeve 22 compressed on to it. The upper fitting is pivotally connected by its clevis 19 to an eye 25 projecting from the lower side of the sleeve 22 and a pivotal connection is made between the lower of the two fittings and the clip 23 by its clevis. In use the vertically disposed rod 4 is tensile loaded and each of the projecting parts of the horizontally disposed rod is tensile loaded. For the compression of the sleeve 1 on to the vertically disposed rod 4, the arrangement shown in FIGURES 1 and 2 may conveniently be used. The sleeve 22 is a two-part member of the kind shown in FIGURES 11 and 12. The vertically disposed rod 4 and fittings form a dropper and the horizontal rod 4 and its fitting form a cross-span member.

Fittings consisting of or comprising sleeves that initially have a cylindrical bore corresponding to the cross-sectional form of the resin-bonded glass fibre rod or tube and an external surface constituting a frustum of a cone are preferred. These are preferably compressed to an external cross-sectional shape which is hexagonal or is hexagonal with rounded corners, the sleeve having six flats formed on its external surface the width of each of which gradually diminishes from a maximum to a minimum or zero as the end from which the rod or tube projects is approached.

Where, as will often be the case, the fitting is required to be attached to an end of the rod or tube, it will generally be preferable to use a one-piece sleeve as shown in FIGURES 1 and 2 and FIGURES 3–5 but where it is required to attach a fitting at some point between the ends of the rod or tube, it may be preferable to use a two-part fitting as shown in FIGURES 11 and 12. Where the fitting serves merely to make a mechanical joint between two axially aligned resin-bonded glass fibre rods or tubes, the fitting may simply consist of a short length of an initially circular section tube of metal which is a sliding fit on the ends of the rods or tubes, the fitting being a one-piece or a two-piece sleeve.

Where the fitting is to be attached to the rod or tube at an intermediate point it may take the form of a sleeve from a portion, for instance, the central portion, of which projects an eye or other attachment device. In this case, only the end portion or portions of the sleeve are compressed. Where this fitting is to be used on a tensioned rod or tube of considerable length such as a cross-span member of an overhead conductor system of an electric railway or trolleybus system, the stem of the eye or other part projecting from the central portion may lie at such an angle to the axis of the sleeve as to assume an approximately vertical position when the sleeve lies away from the central part of the catenary curve assumed by the tensioned rod or tube.

Fittings compression jointed on to resin-bonded glass fibre rods and tubes by the method of the present invention permit the development of the ultimate tensile strength of the resin-bonded glass fibre rods and tubes to be obtained.

What I claim as my invention is:

1. A method of making a tension-resistant connection between a metal fitting and an elongated member of resin-bonded glass fibre, comprising placing a sleeve of malleable metal forming at least a part of the fitting, on an appropriate part of the length of the elongated member so that the elongated member, for the purpose of carrying a tensile load, projects at least one end of the sleeve and compressing the sleeve on to the elongated member in such a manner that the compressive force exerted by the compressed part of the sleeve on the elongated member varies from point to point over substantially the entire length of the sleeve and gradually diminishes from a maximum at a place remote from an end of the sleeve at which the elongated member projects, to a minimum at that end of the sleeve.

2. A method of making a tension-resistant connection between a metal fitting and an elongated member of resin-bonded glass fibre which is of circular cross-section and has a plain cylindrical surface, comprising placing a cylindrical malleable metal sleeve forming at least a part of the fitting on the elongated member such that the latter for carrying a tensile load projects only from one end of the sleeve and compressing the sleeve on to the elongated member with dies whose pressure faces are inclined at a small angle to the longitudinal axis of the die opening in such a way that the compressive force exerted on the elongated member gradually increases from a minimum at the end of the sleeve from which the member projects to a maximum at the extreme end of the member within the sleeve.

3. A method of making a tension-resistant connection between a metal fitting and an elongated member of resin-bonded glass fibre which is of circular cross-section and has a plain cylindrical surface, comprising placing a cylindrical sleeve of malleable metal forming at least a part of the fitting on the elongated member such that the latter for the purpose of carrying tensile loads projects at both ends of the sleeve, and compressing the sleeve on to the elongated member with the aid of dies whose pressure faces are inclined at a small angle to the longitudinal axis of the die opening, the inclination being such that the pressure faces taper from the middle of their length to each end thereof in such a way that the compressive force exerted on the elongated member gradually increases from a minimum at the ends of the sleeve from which the member projects to a maximum at the middle of the sleeve.

4. A method of making a tension-resistant connection between a metal fitting and the aligned end parts of a pair of elongated members made of resin-bonded glass fibre which are each of circular cross-section and have each a plain cylindrical surface, comprising placing a cylindrical sleeve of malleable metal forming at least a part of the fitting on the two end parts such that each elongated member for the purpose of carrying a tensile load projects from an end of the sleeve and compressing the sleeve on to the elongated member with dies whose pressure faces are inclined at a small angle to the longitudinal axis of the die opening, the pressure faces being such that they taper from the middle of their length to each end thereof in such a way that the compressive force exerted on the elongated members gradually increases from a minimum at the ends of the sleeve from which the members project to a maximum at the middle of the sleeve.

5. A method of making a tension-resistant connection between a metal fitting and a rod of resin-bonded glass fibre comprising placing a sleeve of malleable metal forming at least a part of the fitting on a part of the rod which, over the entire length of the part surrounded by the sleeve, has a plain cylindrical surface, and compressing the sleeve on to the plain cylindrical surfaced part of the rod to an extent to cause it to grip the rod frictionally and in such a manner that the compressive force exerted by the compressed sleeve on the rod varies from point to point over substantially the entire length of the sleeve and gradually diminishes from a maximum at a place remote from an end of the sleeve from which the rod projects, for the purpose of carrying a tensile load, to a minimum at that end of the sleeve.

6. A method of making a tension-resistant connection between a metal fitting and a rod of resin-bonded glass fibre which is of circular shape in cross-section and has a plain cylindrical surface, comprising placing a thick walled sleeve of malleable metal forming at least part of the fitting and having a cylindrical bore and a cylindrical outer surface, on an end portion of the rod and compressing the sleeve on to the rod with dies whose pressure faces are inclined at a small angle to the longitudinal axis of the die opening in such a way that the compressive force exerted by the sleeve on the rod gradually increases from a minimum at the end of the sleeve from which the rod projects to a maximum at the extreme end of the rod within the sleeve.

7. A method of making a tension-resistant connection between a metal fitting and an elongated member of resin-bonded glass fibre which is of circular cross-section and has a plain cylindrical surface, comprising placing a cylindrical malleable metal sleeve forming at least a part of the fitting of the elongated member such that the latter for carrying a tensile load projects only from one end of the sleeve and compressing the sleeve on to the elongated member with dies whose pressure faces are inclined at an angle of between 0.25° and 1.75° to the longitudinal axis of the die opening in such a way that the compressive force exerted on the elongated member gradually increases from a minimum at the end of the sleeve from which the member projects to a maximum at the extreme end of the member within the sleeve.

8. A method of making a tension-resistant connection between a metal fitting and an elongated member of resin-bonded glass fibre which is of circular cross-section and has a plain cylindrical surface, comprising placing a cylindrical sleeve of malleable metal forming at least a part of the fitting on the elongated member such that the latter for the purpose of carrying tensile loads projects at both ends of the sleeve, and compressing the sleeve on to the elongated member with the aid of dies whose pressure faces are inclined at an angle of between 0.25° and 1.75° to the longitudinal axis of the die opening, the inclination being such that the pressure faces taper from the middle of their length to each end thereof in such a way that the compressive force exerted on the elongated member gradually increase from a minimum at the ends of the sleeve from which the member projects to a maximum at the middle of the sleeve.

9. A method of making a tension-resistant connection between a metal fitting and the aligned end parts of a pair of elongated members made of resin-bonded glass fibre which are each of circular cross-section and have each a plain cylindrical surface, comprising placing a cylindrical sleeve of malleable metal forming at least a part of the fitting on the two end parts such that each elongated member for the purpose of carrying a tensile load projects from an end of the sleeve and compressing the sleeve on to the elongated member with dies whose pressure faces are inclined at an angle of between 0.25° and 1.75° to the longitudinal axis of the die opening, the pressure faces being such that they taper from the middle of their length to each end thereof in such a way that the compressive force exerted on the elongated members gradually increases from a minimum at the ends of the sleeve from which the members project to a maximum at the middle of the sleeve.

10. A method of making a tension-resistant connection between a metal fitting and a rod of resin-bonded glass fibre which is of circular shape in cross-section and has a plain cylindrical surface, comprising placing a thick walled sleeve of malleable metal forming at least part of the fitting and having a cylindrical bore and a cylindrical outer surface, on an end portion of the rod and compressing the sleeve on to the rod with dies whose pressure faces are inclined at an angle of between 0.25° and 1.75° to the longitudinal axis of the die opening in such a way that the compressive force exerted by the sleeve on the rod gradually increases from a minimum at the end of the sleeve from which the rod projects to a maximum at the extreme end of the rod within the sleeve.

11. A method of making a tension-resistant connection between a metal fitting and a cylindrical elongated member of resin-bonded glass fibre which is of circular cross-section and has a plain cylindrical surface which comprises inserting on an end of the member a malleable metal sleeve having a cylindrical outer surface and a cylindrical bore and exerting by longitudinally inclined die surfaces compressive force upon the sleeve to form on the surface of the sleeve six longitudinally extending flat surfaces each inclined in a transverse direction at an angle of about 120° to each neighbouring flat surface and each flat surface having a width which gradually diminshes from a maximum at a point remote from the end at which the elongated member projects to a minimum at the said end.

12. A method of making a tension-resistant connection between a metal fitting and an elongated member of resin-bonded glass fibre which is of circular cross-section and has a plain cylindrical surface, comprising placing a malleable metal sleeve forming at least a part of the fitting and having a cylindrical bore and an outer surface which tapers from one end to the other, on the elongated member such that the latter, for the purpose of carrying a tensile load, projects only from the smaller end and compressing the sleeve on to the elongated member with parallel faced dies in such a way that the compressive force exerted on the elongated member gradually increases from a minimum at the end of the sleeve from which the elongated member projects to a maximum at the end of the elongated member within the sleeve.

13. A method of making a tension-resistant connection between a metal fitting and an elongated member of resin-bonded glass fibre which is of circular cross-section and has a plain cylindrical surface, comprising placing a malleable metal sleeve forming at least a part of the fitting and having a cylindrical bore and an outer surface which tapers from the middle of the sleeve to each end thereof, decreasing in circumference from the middle towards the ends, on the elongated member such that the latter, for the purposes of being tensile loaded, projects from each end of the sleeve and compressing the sleeve on to the elongated member with the aid of parallel faced dies in such a way that the compressive force exerted on the elongated member gradually increases from a minimum at the end of the sleeve from which the elongated member projects to a maximum at the end of the elongated member within the sleeve.

14. A method of making a tension-resistant connection between a metal fitting and the aligned end parts of a pair of resin-bonded glass fibre elongated members each of which is of circular cross-section and has a plain cylindrical surface, comprising placing a malleable metal sleeve forming at least a part of the fitting and having a cylindrical bore and an outer surface which tapers from the middle of the sleeve to each end thereof, decreasing in circumference from the middle towards the ends, on the two end parts and compressing the sleeve on to the end parts with the aid of parallel faced dies in such a way that the compressive force exerted on each of the elongated members gradually increases from a minimum at the end of the sleeve from which the elongated member projects to a maximum at the end of that elongated member within the sleeve.

15. A method of making a tension-resistant connection between a metal fitting and an elongated member of resin-bonded glass fibre which is of circular cross-section and has a plain cylindrical surface, comprising placing a malleable metal sleeve having a conical outer surface extending from one end to the other end of the sleeve and a cylindrical bore on the elongated member and compressing the sleeve on to the elongated member with the aid of parallel faced dies in such a way that the compressive force exerted on the elongated member gradually increases from a minimum at the end of the sleeve from which the elongated member projects to a maximum at the end of the elongated member within the sleeve.

16. A method of making a tension-resistant connection between a metal fitting and an elongated member of resin-bonded glass fibre which is of circular cross-section and has a plain cylindrical surface, comprising placing a sleeve having a cylindrical bore and a conical outer surface on to the elongated member and by parallel faced dies of substantially hexagon shape in cross-section compressing the sleeve on to the elongated member in such a way that the compressive force exerted by the sleeve on the elongated member gradually diminishes to a minimum at the end at which the elongated member projects.

17. A method of making a tension-resistant connection between a metal fitting and an elongated member of resin-bonded glass fibre which is of circular cross-section and has a plain cylindrical surface, comprising placing a sleeve having a cylindrical bore and a cylindrical outer surface on to the elongated member and by dies having their pressure faces inclined at a small angle to the axis of the die opening and substantially hexagon shape in cross-section, compressing the sleeve on to the elongated member in such a way that the compressive force exerted by the sleeve upon the elongated member gradually diminishes to a minimum at the end at which the elongated member projects.

18. A method of making a tension-resistant connection between a metal fitting and a rod of resin-bonded glass fibre which is of circular shape in cross-section and has a plain cylindrical surface, comprising placing a thick walled sleeve of malleable metal forming at least part of the fitting and having a cylindrical bore and an outer surface which tapers gradually from one end to the other on an end portion of the rod in such a way that the rod projects only from the smaller end of the sleeve, and compressing the sleeve on to the rod with parallel faced dies whereby the compressive force exerted by the sleeve on the rod gradually increases from a minimum at the end of the sleeve from which the rod projects to a maximum at the extreme end of the rod within the sleeve.

19. A method of making a tension-resistant connection between a metal fitting and a rod of resin-bonded glass fibre which is of circular cross-section and has a plain cylindrical surface comprising placing a sleeve of malleable metal, forming at least part of the fitting, and having a length that is short as compared with that of the rod, on an end part of the rod which, over the entire length surrounded by the sleeve, has a plain cylindrical surface, the sleeve having a wall thickness that gradually diminishes from a maximum at the end of the sleeve that is adjacent the neighboring end of the rod to a minimum at the end of the sleeve that is the more remote from the neighboring end of the rod, and by parallel faced dies compressing the sleeve onto the said end part of the rod to an extent to cause it to grip the rod frictionally in such a way that the compressive force exerted on the rod gradually increases from a minimum at the end of the sleeve from which the rod projects to a maximum at the end of the rod within the sleeve.

References Cited by the Examiner
UNITED STATES PATENTS

| | | | |
|---|---|---|---|
| 557,037 | 3/96 | Toquet | 287—80 |
| 663,490 | 12/00 | Cleveland. | |
| 1,681,285 | 8/28 | Ewins | 287—81 |
| 1,959,402 | 5/34 | Anderson | 29—519 X |
| 2,151,032 | 3/39 | Jensen. | |
| 2,198,149 | 4/40 | Bangert. | |
| 2,411,079 | 11/46 | Baule | 29—517 X |
| 2,620,550 | 12/52 | Granberg et al. | 29—517 |
| 2,692,422 | 10/54 | Pierce. | |
| 2,901,822 | 9/59 | Hayden. | |

WHITMORE A. WILTZ, *Primary Examiner.*

ARTHUR M. HORTON, *Examiner.*